United States Patent
Mandal et al.

(10) Patent No.: US 11,188,678 B2
(45) Date of Patent: Nov. 30, 2021

(54) DETECTION AND PREVENTION OF PRIVACY VIOLATION DUE TO DATABASE RELEASE

(71) Applicant: FUJITSU LIMITED, Kawasaki (JP)

(72) Inventors: Avradip Mandal, Sunnyvale, CA (US); Arnab Roy, Santa Clara, CA (US); Hart Montgomery, Redwood City, CA (US); John C. Mitchell, Stanford, CA (US)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 15/975,510

(22) Filed: May 9, 2018

(65) Prior Publication Data
US 2019/0347443 A1   Nov. 14, 2019

(51) Int. Cl.
*G06F 21/62*   (2013.01)
*G06F 16/22*   (2019.01)
*G06F 17/17*   (2006.01)

(52) U.S. Cl.
CPC ........ *G06F 21/6254* (2013.01); *G06F 16/221* (2019.01); *G06F 17/17* (2013.01)

(58) Field of Classification Search
CPC ............. G06F 21/6254; G06F 21/6227; G06F 16/221; G06F 16/24; G06F 16/00; G06F 16/21; G06F 16/24578
USPC ................................. 707/757, 758, 781, 782
See application file for complete search history.

(56) References Cited

U.S. PATENT DOCUMENTS

| | | | | |
|---|---|---|---|---|
| 9,710,670 | B2* | 7/2017 | Smith | G06Q 30/02 |
| 10,083,321 | B2* | 9/2018 | York | H04L 63/107 |
| 10,303,897 | B2* | 5/2019 | Nishi | G06F 21/6254 |
| 10,346,639 | B2* | 7/2019 | Koike | G06F 21/6254 |
| 2010/0024042 | A1* | 1/2010 | Motahari | G06F 21/577 726/26 |
| 2010/0169332 | A1* | 7/2010 | Bezzi | G06F 16/24 707/757 |

(Continued)

FOREIGN PATENT DOCUMENTS

| | | |
|---|---|---|
| EP | 2642405 A1 | 11/2011 |
| FR | 3048101 A1 | 2/2016 |

OTHER PUBLICATIONS

U.S. Appl. No. 15/487,403, filed Apr. 13, 2017.

(Continued)

*Primary Examiner* — Dangelino N Gortayo
(74) *Attorney, Agent, or Firm* — Maschoff Brennan (57) ABSTRACT

According to some examples, computer-implemented methods to detect a potential privacy violation as a result of a release of a database are described. An example computer-implemented method may include anonymizing a database and calculating a measure of entropy resulting from a release of the anonymized database without releasing the anonymized database. The method may also include determining whether the calculated measure of entropy satisfies a privacy threshold and, responsive to a determination that the calculated measure of entropy satisfies the privacy threshold, releasing the anonymized database. The method may further include, responsive to a determination that the calculated measure of entropy does not satisfy the privacy threshold, not allowing the release of the anonymized database.

20 Claims, 4 Drawing Sheets

(56) References Cited

U.S. PATENT DOCUMENTS

| | | | |
|---|---|---|---|
| 2015/0007249 A1* | 1/2015 | Bezzi | G06F 21/6227 726/1 |
| 2015/0033356 A1* | 1/2015 | Takenouchi | H04L 63/0407 726/26 |
| 2015/0113012 A1* | 4/2015 | Silver | H04W 4/08 707/758 |
| 2016/0034715 A1* | 2/2016 | Dubov | G06F 16/24578 707/781 |
| 2017/0061159 A1* | 3/2017 | Dubov | G06N 7/005 |
| 2018/0004978 A1* | 1/2018 | Hebert | G06F 16/2457 |
| 2018/0165475 A1* | 6/2018 | Veeramachaneni | G06N 7/005 |

OTHER PUBLICATIONS

Narayanan, Arvind, and Vitaly Shmatikov. "Robust de-anonymization of large sparse datasets." 2008 IEEE Symposium on Security and Privacy (May 18, 2008).

Datta et al., "Provable de-anonymization of large datasets with sparse dimensions." International Conference on Principles of Security and Trust. Springer Berlin Heidelberg, Mar. 24, 2012.

Sweeney, Latanya. "k-anonymity: A model for protecting privacy." International Journal of Uncertainty, Fuzziness and Knowledge-Based Systems 10.05 (Jan. 1, 2002): 557-570.

Li et al., . "t-closeness: Privacy beyond k-anonymity and l-diversity." Data Engineering, 2007. ICDE 2007. IEEE 23rd International Conference on. IEEE, Dec. 20, 2007.

Machanavajjhala et al., Mar. 2007. I-diversity: Privacy beyond k-anonymity. ACM Transactions on Knowledge Discovery from Data (TKDD), 1(1), p. 3.

Kifer, D. and Machanavajjhala, A., 2014. Pufferfish: A framework for mathematical privacy definitions. ACM Transactions on Database Systems (TODS), 39(1), p. 3.

Cormode, G. and Srivastava, D., Jun. 29, 2009. Anonymized data: generation, models, usage. In Proceedings of the 2009 ACM SIGMOD International Conference on Management of data (pp. 1015-1018). ACM.

Barbaro, Michael and Zeller, Tom Jr., "A Face Is Exposed for AOL Searcher No. 4417749", Aug. 9, 2006, Retrieved From: http://www.nytimes.com/2006/08/09/technology/09aol.html.

P. Samarati and L. Sweeney. Protecting privacy when disclosing information: k-anonymity and its enforcement through generalization and suppression. Technical report, Technical report, SRI International, Aug. 1998.

Mandal et a., Privacy for targeted advertising. Cryptology ePrint Archive, Report 2017/658, Aug. 9, 2017.

Dasgupta et a., "Algorithms." McGraw-Hill, Inc., Jul. 18, 2006.

Dwork, C et al., "Differential Privacy." ICALP 2006. LNCS, vol. 4052, pp. 1-12. Springer, Heidelberg (Jul. 1, 2006).

European Search Report in application No. 19156285.9 dated Aug. 29, 2019.

Li et al., "Closeness: A New Privacy Measure for Data Publishing", IEEE Transactions on Knowledge and Data Engineering, vol. 22, No. 7, Jul. 2010.

EP Search Report in Application No. 19 156 285.9 dated Dec. 2, 2020.

* cited by examiner

DETECTION AND PREVENTION OF PRIVACY VIOLATION DUE TO DATABASE RELEASE

FIELD

This disclosure relates generally to privacy preservation.

BACKGROUND

Data releases may be subject to de-anonymization attacks. De-anonymization attacks may attempt to identify individuals associated with some particular released data. Individuals may be associated with the data even in instances where traditionally personal identifiers, such as names, telephone numbers, addresses, social security and/or other unique identification numbers, or the like, are absent in the released data. For example, it has been observed that approximately 87 percent of the population of the United States may be uniquely identified based on a gender, a date of birth, and a 5-digit residence zip code. Thus, anonymity may not be achieved even in instances where data does not include traditional identifiers for individuals included in the data.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, computer-implemented methods to detect a potential privacy violation as a result of a release of a database are described. An example computer-implemented method may include anonymizing a database and calculating a measure of entropy resulting from a release of the anonymized database without releasing the anonymized database. The method may also include determining whether the calculated measure of entropy satisfies a privacy threshold and, responsive to a determination that the calculated measure of entropy satisfies the privacy threshold, releasing the anonymized database. The method may further include, responsive to a determination that the calculated measure of entropy does not satisfy the privacy threshold, not allowing the release of the anonymized database.

The objects and advantages of the embodiments will be realized and achieved at least by the elements, features, and combinations particularly pointed out in the claims.

Both the foregoing general description and the following detailed description are given as examples, are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Data releases may be subject to de-anonymization attacks. Several existing techniques attempt to anonymize data in a manner that discourages de-anonymization attacks. Some conventional anonymization techniques may remain susceptible to de-anonymization and/or may anonymize the data in a manner that may render the techniques suboptimal for some applications. For example, some conventional anonymization techniques may result in data that may be associated with particular users through comparisons to publically available data. Also, some conventional anonymization techniques may remove information that may be relevant to a system receiving the resulting data. For example, conventional anonymization techniques may be incompatible with recommendation systems, such as online advertising systems. For instance, some conventional anonymization techniques may not facilitate row querying or tracing back to the data.

In some instances, private data anonymized via conventional anonymization techniques may be de-anonymized through comparisons to public data (public information). To illustrate, private rating data may be released with customer identification information removed. The private rating data may reflect private ratings assigned by users to products and/or services. Public rating data may reflect public ratings assigned by a user to products and/or services. The private rating data may be compared to the public rating data to associate the private data to a user known to be associated with the public rating data. Thus, for example, data that a user may have believed was private, such as private data that may not be included in the public data, may be publically associated with the user by de-anonymization attacks that may use the private data in a manner not authorized by the user.

Furthermore, conventional anonymization algorithms may remove relevant data in the attempt to withstand de-anonymization attacks. For example, some anonymization algorithms may remove and/or generalize attributes such that identifying characteristics associated with a particular user match some number of additional users in the same database. Accordingly, relevant information may be removed or generalized.

Other conventional anonymization algorithms may remove private database entries that are common to the private data and the public data in an attempt to discourage matching the private data to the public data. However, in some instances, machine learning may be employed to fill in removed entries with expected values and then associate the filled private data with the public data. Conventional anonymization technology may not facilitate provable, quantitative privacy for individualized data, used coarsely, in the presence of public information.

To this end, techniques are disclosed herein for quantifying a new measure of privacy that may result from a release of new data (new information), and not releasing the new data if the release of the new data may result in a privacy violation. A privacy violation may occur, for example, when the measure of privacy as a result of releasing the new data fails to satisfy a privacy threshold. Thus, in accordance with certain of the embodiments disclosed herein, improved data release techniques provide reliable quantification of privacy that may result from the release of new data, determination of an occurrence of a privacy violation based on a comparison of the quantified privacy with a privacy threshold, and prevention of a privacy violation by not releasing the new data. These techniques facilitate the release of new data in a manner that ensures that privacy of users is not violated. As used herein, the term "privacy" refers, in addition to its plain and ordinary meaning, to uncertainty or a lack of order or predictability. The term "entropy" is a standard measure of uncertainty, where higher uncertainty implies higher privacy.

In accordance with some embodiments of the present disclosure, a data release system may implement some or all of the improved data release techniques disclosed herein. In an example implementation, a data release system may include a data releaser, which is configured to determine a measure of entropy resulting from a release of new data. In an example embodiment, the data releaser may, for instance, calculate a new measure of entropy for each user associated with the new data as a result of the release of the new data, and determine the smallest calculated new measure of entropy (e.g., the smallest calculated new entropy for a given user) to be the new entropy that may result from the release of new data. In any case, the data releaser calculates a new measure of entropy that may remain as a result of the release of the new data.

In these and other embodiments, the data releaser may also be configured to determine whether the calculated new entropy satisfies a privacy threshold. In response to the privacy threshold not being satisfied, the privacy violation detector may detect a privacy violation (e.g., determines that a privacy violation may occur by the release of the new data). In this instance, the data release system may sanitize the new data by, for example, further perturbing and/or anonymizing the new data, and again determine whether the sanitized data may be released with a reduced risk of a privacy violation. In some embodiments, the data release system may sanitize the new data by perturbing the data, adding noise to the data, reducing the amount or volume of data, or otherwise making any suitable alternation or modification to increase uncertainty in the new data.

In response to the privacy threshold being satisfied, the data releaser may determine that a privacy violation may not likely occur by the release of the new data, and allows the release of the new data. In either case, the data release system is privacy preserving in that the uncertainty of the attributes of the users in the new data is at a level that satisfies the specified privacy threshold even with the release of the new data. In some embodiments, the new data may be included in an anonymized database in which the identities of the users in the database are anonymized (e.g., hidden). For instance, the user identifiers in the anonymized database may be replaced with corresponding tracking data or other suitable random numbers.

The disclosed techniques significantly improve the accuracy and efficiency in facilitating a provable, quantitative measure of privacy resulting from a release of new data, and a determination of whether the release of the new data may result in a privacy violation based on a privacy threshold. Significant advantages may be realized, including the ability to accurately and quantitatively measure privacy as well as detect privacy violations that may result from releases of new data without having to actually release the new data. These and other advantages and alternative embodiments will be apparent in light of this disclosure.

Figure 1:
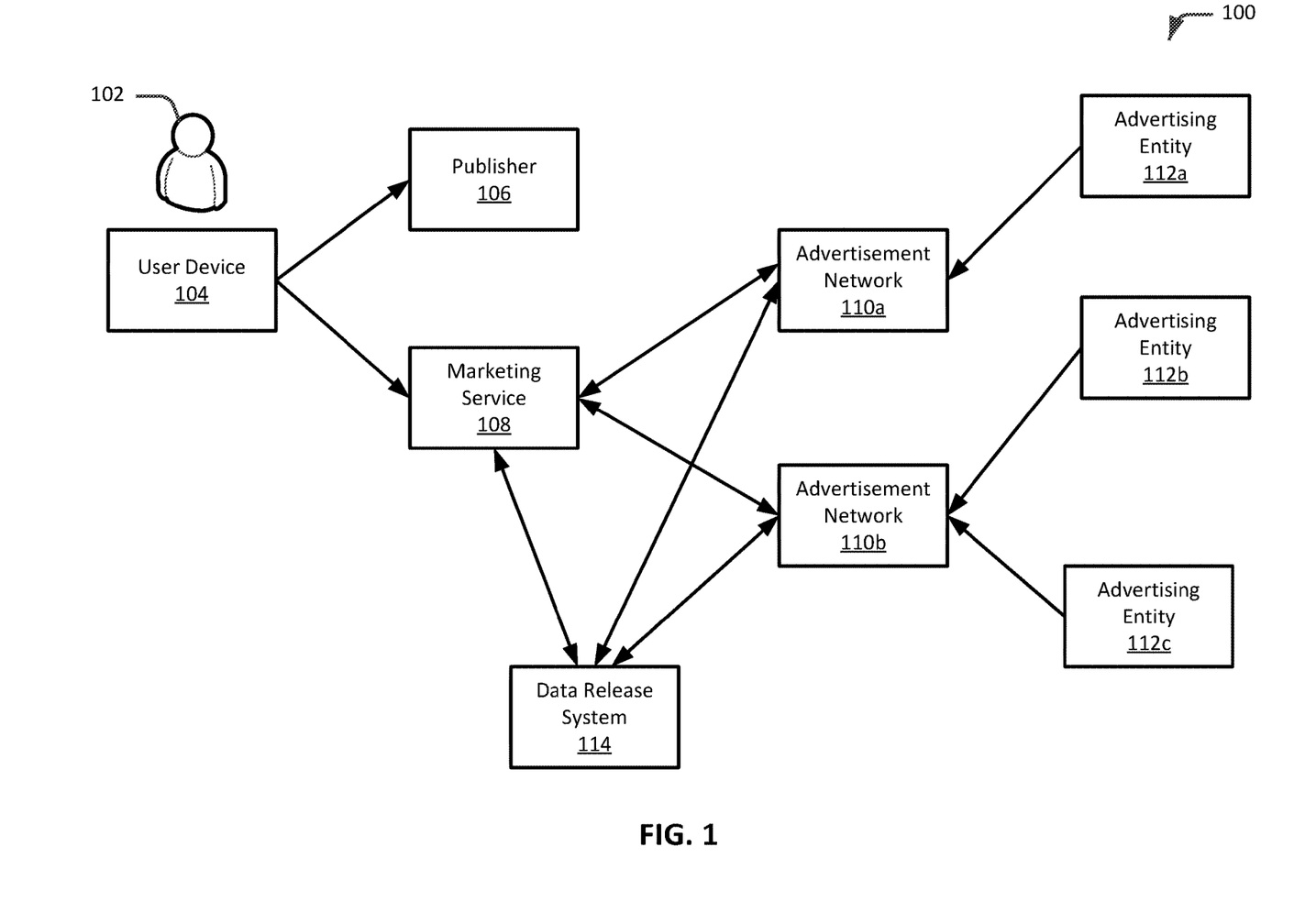
FIG. 1 is a diagram illustrating an example targeted advertising system.

Turning now to the figures, FIG. 1 is a diagram illustrating an example targeted advertising system 100, in accordance with at least some embodiments of the present disclosure. As depicted, system 100 may include a user 102 and an associated user device 104. User device 104 may include a device capable of connecting to the internet and/or navigating the world-wide web. For example, user device 104 may include a desktop computer, a laptop computer, a tablet computer, a mobile phone, a wearable device, or the like or any combination thereof.

User device 104 may interact with and receive content from a publisher 106. Publisher 106 may provide or otherwise make available content to user device 104. The content may include a website, a webpage, an internet-connected application, or the like or any combination thereof.

Furthermore, an advertisement may be delivered to user device 104 from a marketing service 108. The advertisement may be displayed alongside the content from publisher 106, integrated into the content from publisher 106, displayed in a separate frame, window, or tab relative to the content from publisher 106, or the like or any combination thereof. An opportunity to deliver an advertisement to user device 104 may be described as an advertisement impression.

Marketing service 108 may include an advertisement exchange service, an advertisement auction service, or the like or any combination thereof. Marketing service 108 may generally match users, such as user 102 and/or user devices, such as user device 104, to targeted advertisements. Marketing service 108 may, for instance, receive internet cookie data associated with user device 104 and/or user 102.

Marketing service 108 may share the cookie data with advertisement networks, such as an advertisement network 110a and an advertisement network 110b (collectively, "advertisement networks 110"). Advertisement networks 110 may submit bids to marketing service 108. The bids may reflect an amount of money that advertisement networks 110 are willing to pay if a particular advertisement is delivered to user device 104, or an amount of money that the advertisement networks 110 are willing to pay if user 102 navigates to a location associated with the advertisement (described herein as "click through"), or the like or any combination thereof.

Advertisement networks 110 may generally manage advertisement campaigns associated with advertising entities such as an advertising entity 112a, an advertising entity 112b, and an advertising entity 112c (collectively, "advertising entities 112"). Advertising entities 112 may generally include businesses, charities, political organizations, or the like or any combination thereof. The advertising campaigns may include advertisements to be delivered to user devices, such as user device 104, such that the advertisements may be seen by users, such as user 102.

By way of an example use case, an advertisement campaign may include one or more advertisements for a particular automobile associated with an automobile manufacturer advertising entity, such as advertising entity 112a. Advertising entity 112a may provide the vehicle advertisements to advertisement network 110a. Additionally or alternatively, advertising entity 112a may provide rules that may identify a demographic or demographics to which the advertisement may be delivered. The identified demographic or demographics may include user 102. Advertising entity 112a may alternately or additionally provide payment rules that may identify an amount of money the advertising entity 112a is willing to pay if the advertisement is delivered to user device 104, is clicked through by user 102, or the like.

Advertisement networks 110 may have multiple advertisement campaigns from multiple advertising entities and may submit bids to marketing service 108. An advertisement associated with a winning bid may be delivered to user 102. For instance, advertising network 110a may submit a bid of $0.003 to deliver an advertisement associated with advertising entity 112a, and advertising network 110b may submit a bid of $0.002 to deliver an advertisement associated with advertising entity 112b. The $0.003 bid may be the winning bid and the advertisement associated with advertising entity 112a may be delivered to user device 104. Marketing service 108 and advertisement networks 110 may maintain and may share data regarding user 102, user device 104, other users, and other user devices. The data may permit advertisement networks 110 to determine whether to bid on an advertisement impression opportunity. Alternately or additionally, the data may permit advertisement networks 110 to determine an amount of money to bid on an advertisement impression opportunity. For example, advertising entities 112 may pay to deliver advertisements to a particular demographic and/or may pay relatively more to deliver advertisements to another demographic.

Conventionally, such data may be susceptible to de-anonymization attacks. For instance, the data may include a database with each row associated with a different user. A de-anonymization attacker may compare the data with public information from other databases, such as information from social networks, rating and review services, discussion websites, public records, data describing traits within the general population, or the like or any combination thereof.

In some embodiments, a sanitized database may be generated for use by advertisement networks 110 and marketing service 108. The sanitized database may, for instance, be a perturbed database or otherwise suitably altered database. The sanitized database may be used to provide advertisement networks 110 and marketing service 108 with relevant information regarding user 102 and/or user device 104. The sanitized database may alternately or additionally be configured to resist de-anonymization attempts. In some embodiments, the sanitized database may include information regarding interests and behaviors of user 102. For instance, the information included in the sanitized database may be perturbed or suitably altered to maintain the privacy of user 102. The sanitized database may be indexed by tracking data, which may be associated with respective users, such as user 102. The tracking data may be selected randomly, such that the tracking data may not provide information regarding the particular identities of the associated users. For instance, indexing the sanitized database using tracking data associated with users to not provide user identity information may generate an anonymized sanitized database. In some embodiments, the tracking data may facilitate row queries or traceback requests to the sanitized database by marketing service 108 and/or advertisement networks 110.

In some configurations, information regarding user 102 may be provided from the sanitized database to marketing service 108 and/or advertisement networks 110. For example, a row of data associated with user 102 and/or user device 104 may be provided to marketing service 108 and/or advertisement networks 110. Advertisement networks 110 may use the information from the sanitized database to determine an amount of money to bid on an advertisement impression for user 102.

In some embodiments, system 100 may include a data release system 114. Data release system 114 may generate the sanitized database. Data release system 114 may provide information from the sanitized database to marketing service 108 and/or advertisement networks 110. In some configurations, data release system 114 may be included in marketing service 108, and the information from the sanitized database may be provided to advertisement networks 110.

Data release system 114 may receive traceback requests to information in the sanitized database. For example, data release system 114 may receive and respond to requests for data associated with tracking data of the sanitized database. As such, data release system 114 may, in various aspects, function as an anonymizer.

In some embodiments, data release system 114 may determine the entropy that may result from a release of the sanitized database prior to releasing and or otherwise making available the sanitized database. Data Release system 114 may then determine whether the entropy resulting from a release of the sanitized database satisfies a privacy threshold. In response to the privacy threshold not being satisfied, data release system 114 may determine that a privacy violation may occur by the release of the sanitized database. In such cases, data release system 114 does not allow the release of the sanitized database in response to a determination that a privacy violation may occur. Conversely, data release system 114 allows the release of the sanitized database in response to a determination that a privacy violation may not occur.

Figure 2:
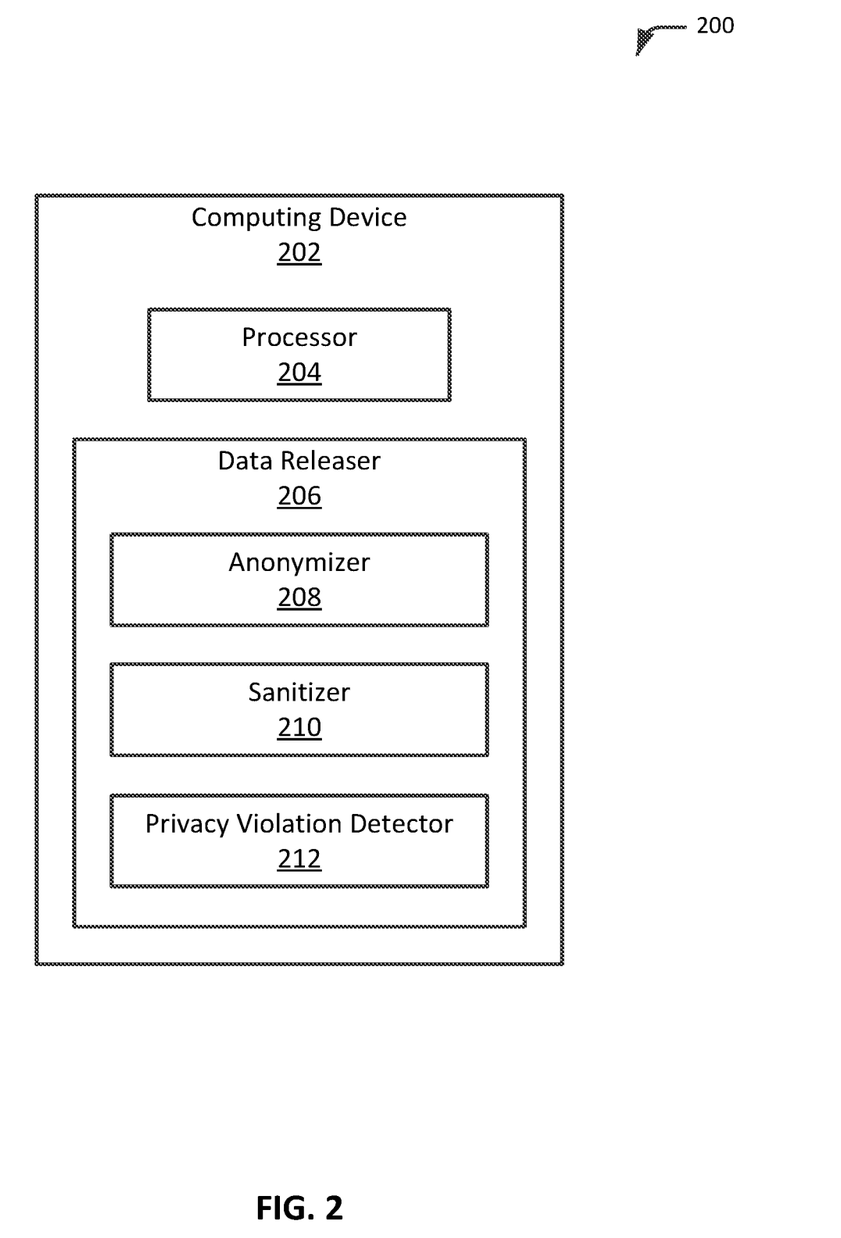
FIG. 2 is a block diagram illustrating selected components of an example data release system.

FIG. 2 is a block diagram illustrating selected components of an example data release system 200, in accordance with at least some embodiments of the present disclosure. Data release system 200 may generally correspond to data release system 114 of FIG. 1, in certain embodiments. As shown in FIG. 2, data release system 200 includes a computing device 202, which includes a processor 204 and a data releaser 206. Computing device 202 is configured to execute data releaser 206, which includes an anonymizer 208, a sanitizer 210, and a privacy violation detector 212. In various embodiments, computing device 202 may be a personal computing device, such as a desktop computer, notebook, laptop, tablet, smart phone, mobile device, and mobile phone, to name a few examples. In other embodiments, computing device 202 may be a server computing device configured to provide functionality, such as that provided by data releaser 206, to other devices and applications.

In various embodiments, additional components (not illustrated, such as a display, user input device, non-transitory memory, etc.) or a subset of the illustrated components may be employed without deviating from the scope of the present disclosure. For instance, other embodiments may integrate the various functionalities of anonymizer 208, sanitizer 210, and privacy violation detector 212 into fewer modules (e.g., one or two) or additional modules (e.g., four or five, or more). In addition, further note that the various components of computing device 202 may all be in a stand-alone computing system according to some embodiments, while in others, may be distributed across multiple machines. For example, according to an embodiment, data releaser 206 or various functionalities of anonymizer 208, sanitizer 210, and privacy violation detector 212 may be provided in a computing system distinct from computing device 202. In a more general sense, the degree of integration and distribution of the functional component(s) provided herein may vary greatly from one embodiment to the next, as will be appreciated in light of this disclosure.

Data releaser 206 is configured to generally provide the overall control of the detection and prevention of a privacy violation resulting from a release of new data utilizing the services and functionality of anonymizer 208, sanitizer 210, and privacy violation detector 212, as necessary. In particular, according to some embodiments, data releaser 206 may initiate the anonymization and/or sanitization of new data, for example, prior to the release of the new data. In an example implementation, the new data may be provided in a new data database D, which may include a sequence of rows, one row for a given user, and a set of attributes of the user. Here, each user may be a user u from a set of individuals or 'users' $u_1, u_2, \ldots$ in the universe, which may be denoted as U. The domain of the set of columns in database D, which are the attributes of interest of a user, may be denoted as X. In database D, the column values for a user u may be denoted as $D_u$. Accordingly, database D provides a mapping from a set of users to corresponding sets of attributes X for each user in the set of users. Further, all such databases D may be included in a domain d, which is the set of functions from U to X. The relations described above may be denoted as follows:

$$U \triangleq \{u_1, u_2, \ldots\} \qquad [1]$$

$$d \triangleq U \to X, D \in d, D_u \triangleq D(u) \qquad [2]$$

To this end, a reasonable inference may be made by data releaser 206 that there is a fixed set of users in the universe and that the identities of the users are publicly known (e.g., public data). Further, for each user, there is an a priori distribution on the set of attributes X, and the distribution aggregated over all users may be denoted as P, as represented by the following:

$$\text{Distribution on databases } P: d \to [0,1] \qquad [3]$$

In some embodiments, data releaser 206 may initiate the calculation of a measure of entropy resulting from the release of an anonymized and, in some cases, sanitized new data database, and the comparison of the calculated entropy to a privacy threshold to determine whether a privacy violation may occur by the release of the new data database. In the case of a determination that a privacy violation may occur, data releaser 206 may initiate a further sanitization of the new data in the new data database, and determine whether a privacy violation may occur by the release of the further sanitized new data database. Otherwise, in the case where a privacy violation may not occur, data releaser 206 may release the anonymized new data database.

The privacy threshold may be preconfigured or specified to be a suitable value, for example, by a provider of the new data. According to one embodiment, the privacy threshold may be based on the number of columns in the new data database, such as database D. For instance, in the case where the columns are binary columns (e.g., include a value 1 or 0), if any user in the new data database has x bits of information (e.g., x binary columns), the privacy threshold value may be any number between 0 and x. In some embodiments, the privacy threshold may be a tunable parameter. For example, the privacy threshold may be specified in a configuration file that is accessible by data release system 200, and a system administrator (or other authorized user) may tune or adjust the privacy threshold to achieve a particular performance of data release system 200. As such, the system administrator may tune the privacy threshold to achieve a particular level of privacy with the release of new data. As will be appreciated in light of this disclosure, the level of the privacy threshold may be set based on factors such as the type of new data, the sensitivity of the new data, and the volume of the new data, to name three examples. For example, medical and financial data may be more sensitive than music or food preference data. As a higher privacy threshold provides a higher level or degree of privacy relative to a lower privacy threshold, the privacy threshold may be set to a high level (or value) for sensitive new data, and even a higher level for highly sensitive new data. Note, however, that a lower privacy threshold provides a higher level or degree of utility of the released new data relative to a higher privacy threshold. For example, a data consumer may have an application whose effectiveness depends on a certain level of accuracy of the provided data. In such cases, sanitizing (e.g., perturbing, randomizing, etc.) the new data to maintain privacy based on a high privacy threshold may effectively nullify the utility of the released new data.

Anonymizer 208 is configured to anonymize the new data database D. According to one embodiment, anonymizer 208 may apply a mapping function τ to the domain of users U to anonymize the users u in the domain of users U. In an example implementation, the mapping function τ may be a bijective function that pairs each user u in the domain of users U to a set of indices, such as random tracking data, random numbers, or other suitable random identifiers. Here, applying the mapping function τ to the domain of users U generates a corresponding anonymized domain of users U', which may be denoted as follows:

$$\text{Mapping function } \tau: U \to U' \qquad [4]$$

As will be appreciated in light of this disclosure, anonymizer 208 may apply the mapping function τ to the users u included in database D to generate a corresponding anonymized database D', which may be denoted as follows:

$$\text{Mapping function } \tau: D \to D' \qquad [5]$$

Here, database D' is an anonymized database in which the identifiers of the users u included in database D may be replaced with corresponding random tracking data in database D', according to some embodiments.

Sanitizer 210 is configured to sanitize the new data database D. According to one embodiment, sanitizer 210 may apply a suitable mechanism M that takes P and database D as inputs to generate a sanitized database D', which may be denoted as follows:

$$\text{Mechanism } M: D \to D' \qquad [6]$$

Here, sanitized database D' is a sanitized version of database D.

According to one embodiment, mechanism M may operate to perturb the values of database D to generate the sanitized database D'. Perturbing the values of a database may generally include reducing the granularity, the precision, and/or the accuracy of the data in the perturbed database. For example, where the database values include real numbers, noise from an a priori defined distribution, such as Gaussian noise, may be applied or added to the values. Additionally or alternatively, where the database values include categorical values, the values may be perturbed to provide fewer categories. For example, if the database values include zip code entries, the zip codes may be truncated. For example, the zip code 94085 may be perturbed to 9408* or may be perturbed to 940**. Perturbing the database may also include, for instance, dropping one or more columns from the database, dropping columns that are deemed more sensitive than other columns in the database, and clustering rows that are similar in the database and publishing the corresponding cluster average for each row in the database, to name three examples.

In some embodiments, entries associated with relatively more utility may be relatively less perturbed. Additionally or alternatively, entries associated with relatively less utility may be relatively more perturbed. For example, in some implementations, entries that may be of relatively higher interest to a receiver of information from the sanitized database, such as the marketing service 108 and/or the advertisement networks 110 of FIG. 1, may be relatively less perturbed. Accordingly, for example, entries that may have relatively less utility may be relatively more perturbed than entries that have relatively more utility to provide information that may be utilized by the receiver. By way of example, where zip code entries have a relatively high utility and age entries have a relatively low utility, the zip code entries may be unperturbed or may be lightly perturbed, and the age entries may be heavily perturbed, such as by changing particular ages to age ranges, such as <18 years, 18-29 years, 30-44 years, 45-60 years, >60 years, or the like. In any such cases, sanitizer 210 may apply mechanism M to perturb the values of database D to generate a sanitized database D'.

Privacy violation detector 212 is configured to detect an occurrence of a privacy violation resulting from a release of new data. In some implementations, for instance, the new data may be provided in database D. In such cases and as previously described, database D may be anonymized and sanitized, and the anonymized and sanitized database D may be denoted as τ(M(D,P)). According to one embodiment, privacy violation detector 212 is configured to calculate a measure of entropy resulting from a release of the anonymized and sanitized database τ(M(D,P)). The calculated measure of entropy is the remaining or "left over" entropy after the release of τ(M(D,P)).

In particular, according to one embodiment, the remaining entropy for a user u from the universe of all users U resulting from a release of τ(M(D,P)) may be expressed as follows:

$$\text{Privacy}_u = H_{D \leftarrow P}(u, D_u | \tau(M(D,P))) \quad [7]$$

where H is the standard notation for entropy measurement, and $H_{D \leftarrow P}(u, D_u)$ is the measure of current entropy for user u given the public data prior to the release of the new data in database τ(M(D,P)). That is, $H_{D \leftarrow P}(u, D_u)$ is the prior amount of privacy of user u based on the public data prior to the release of database τ(M(D,P)). From expression [7], it follows that the entropy loss for user u as a result of the release of database τ(M(D,P)) is the difference of the current entropy prior to the release of database τ(M(D,P)) and the remaining entropy after the release of database τ(M(D,P)), which may be expressed as follows:

$$\Delta \text{Privacy}_u = H_{D \leftarrow P}(u, D_u) - H_{D \leftarrow P}(u, D_u | \tau(M(D,P))) \quad [8]$$

Thus, the privacy loss for user u, $\Delta\text{Privacy}_u$, is the quantity of information learned regarding user u as a result of the release of database τ(M(D,P)). Further, the privacy loss for all users as a result of the release of database τ(M(D,P)) is the maximum (e.g., largest) of the privacy loss for each individual user u, which may be denoted as:

$$\Delta \text{Privacy} = \max_{u \in U}[\text{Privacy}_u] \quad [9]$$

In an example use case and embodiment for a small domain database release, suppose a new data database D includes n users, $u_1, u_2, \ldots, u_n$. Also suppose that database D includes a single bit (e.g., single binary column) $s_i$ for each user $u_i$, and that $\tilde{p}_i$ is the probability that bit $s_i$ is 1. For example, the bit (column) may provide information regarding a user attribute, such as "owns a dog", "owns a truck", "owns a house", and "married", to name four examples. Here, the column is a single bit attribute in that the value of each attribute may be either a 1 or 0, which indicates whether the attribute specified by the column is true (1) or not true (0) for the user. Note that, in the case of a single bit, the domain size of database D is 2 in that the single bit may be either 1 or 0. If an anonymized version of database D described above is released with t many 1's, the remaining entropy for user $u_i$ is as follows:

$$-(q_i \log q_i + (1-q_i)\log(1-q_i)) \quad [10]$$

where $q_i$ is the probability that user $u_i$'s attribute (bit) is 1, which may further be expressed as follows:

$$q_i = \frac{\tilde{p}_i \left( \sum s^{\{1,\ldots,n\}\setminus\{i\}}_{|S|=t-1} \prod_{j \in S} \tilde{p}_j \prod_{j \in \{1,\ldots,n\}\setminus S \setminus \{i\}} (1-\tilde{p}_j) \right)}{\sum s^{\{1,\ldots,n\}}_{|S|=t} \prod_{j \in S} \tilde{p}_j \prod_{j \in \{1,\ldots,n\}\setminus S} (1-\tilde{p}_j)} \quad [11]$$

Note that the logarithms expressed herein are with respect to base 2.

According to one embodiment, expression [11] may be evaluated by applying the coin toss probability calculation technique of counting heads. The counting heads technique may be utilized to determine the probability of obtaining exactly k heads when n biased coins are tossed independently at random, where $p_i$ is the probability that the $i^{th}$ coin comes up heads. The set of n biased coins may be expressed as $S_n = \{\text{coin}_1, \ldots, \text{coin}_n\}$. Note that $\phi = S_0 \subset S_1 \subset S_2 \ldots \subset S_n = \{\text{coin}_1, \ldots, \text{coin}_n\}$, and a set S for the $i^{th}$ biased coin may be denoted as $S_i = S_{i-1} \cup \{\text{coin}_i\}$. Suppose P(i,k) denotes the probability of obtaining exactly k heads while tossing coins in set $S_i$. In this case, for $i \in [1,n]$, P(i,0) may be expressed as follows:

$$P(i,0) = \Pi_{j=1}^{i}(1-p_j) \text{ and } P(i,i) = \Pi_{j=1}^{i} p_j \quad [12]$$

For $\in[2,n]$, $k \in [0, i-1]$, P(i,k) may be expressed as follows:

$$P(i,k) = p_i P(i-1,k-1) + (1-p_i)P(i-1,k) \quad [13]$$

It will be appreciated that P(i,k) may be computed using O(n²) computations, and in time O(n(log n)²) using Fast Fourier transform-based polynomial multiplication techniques.

Applying the coin toss technique to the $q_i$ expression [11] above, the numerator of expression [11] may be evaluated as the product of ($\tilde{p}_i$) and (the probability of exactly t−1 heads when tossing coins from set S less coin $s_i$). Note that coin $s_i$ is associated with user $u_i$, and tossing coin $s_i$ determines whether user $u_i$'s bit is 1 (heads) or 0 (tails). Also, the denominator of expression [11] may be evaluated as (the probability of exactly t heads when tossing coins from set S). Thus, for the case where database τ(M(D,P)) includes a single bit $s_i$ for each user $u_i$, and database τ(M(D,P)) is released with t many 1's, privacy violation detector 212 may calculate the remaining entropy for user $u_i$, which is $-(q_i \log q_i + (1-q_i) \log(1-q_i))$, as explained previously. Note that the calculated remaining entropy for user $u_i$ is the left over entropy resulting from the release of database τ(M(D,P)) that includes a single bit for each user. Furthermore, note that the probabilities calculated to determine the left over entropy are for the public data, assuming that the new data in database τ(M(D,P)) is released and made public.

As previously explained, the evaluation of logarithmic term [10] to determine the remaining entropy for user $u_i$ applies for cases where database D includes a single bit $s_i$ for each user $u_i$. As will be appreciated in light of this disclosure, logarithmic term [10] may be extended to a larger domain size, such as multiple columns (e.g., two columns, three columns, etc.). In particular, the coin toss technique may be applied to calculate a remaining entropy for user $u_i$ as a result of a release of a database D that includes multiple bits (e.g., multiple columns) $s_i$ for each user $u_i$ as will be described in detail below.

Extending the coin toss technique to a release of a database having a larger domain size, suppose the released database has a domain size T for each user u, and that $\widetilde{p_{ij}}$ is the probability that the $i^{th}$ coin outputs (e.g., generates) $state_j$, for $j \in [1,T]$. Here, the database includes log (T) number of bits for each user included in the database. As previously explained, in the case of a single bit attribute, each attribute may be either 1 or 0. It follows then, in the case of N single bit attributes, the domain size T is $2^N$ ($T=2^N$) in that the total number of possible values for the N attributes is $2^N$. In a general sense, a database's domain size is based on the amount of information included in the database. Furthermore, $state_j$ refers to the state of the attributes of one particular user u. For example, in the case of the $i^{th}$ coin outputting $state_j$, for instance, $state_j$ refers to the state of the attributes of user $u_i$. Suppose P(i, $k_1$, $k_2$, ..., $k_T$) denotes the probability of obtaining exactly $k_j$ many $state_j$xs, for $j \in [1, T]$, while tossing coins in set $S_i$, which may be expressed as $\Sigma_{j=1}^T k_j = i$. P(i, $k_1$, $k_2$, ..., $k_T$) may then be expressed as follows:

$$P(i, k_1, k_2, \ldots, k_j, \ldots, k_T) = \Sigma_{j=1} \widetilde{p_{ij}} P(i-1, k_1, k_2, \ldots, k_j-1, \ldots, k_T) \quad [14]$$

It will be appreciated that P(i, $k_1$, $k_2$, ..., $k_j$, ..., $k_T$) may be estimated in time $O(n^T)$ using T dimensional dynamic programming.

In an example use case and embodiment of a multiple column database release, suppose a new data database, such as a database $\tau(M(D,P))$, has been released with $k_1$ many $state_1$'s, $k_2$ many $state_2$'s, ..., and $k_T$ many $state_T$'s. In this case, the remaining entropy for user $u_i$ is as follows:

$$-\left(\sum_{j=1}^{T} q_{ij} \log q_{ij}\right) \quad [15]$$

where $q_{ij}$ is the probability that user $u_i$'s attributes are in $state_j$, which may further be expressed as follows:

$$q_{ij} = \frac{\widetilde{p_{ij}} P(S \setminus \{i\}, k_1, k_2, \ldots, k_j-1, \ldots, k_T)}{P(S, k_1, k_2, \ldots, k_T)} \quad [16]$$

Similar to P(i, $k_1$, $k_2$, ..., $k_T$) explained above, P(S, $k_1$, $k_2$, ..., $k_T$) is the probability of obtaining exactly $k_1$ many $state_1$'s, $k_2$ many $state_2$'s, ..., and $k_T$ many $state_T$'s while tossing coins from set S. Note that all P(S\{i}, $k_1$, $k_2$, ..., $k_j-1$, ..., $k_T$) terms for $j \in [1, T]$ are evaluated when computing a higher order term P(S\{i}, $k_1$, $k_2$, ..., $k_j$, ..., $k_T$).

Thus, for the case where database $\tau(M(D,P))$ includes multiple bits $s_i$ for each user $u_i$, and database $\tau(M(D,P))$ is released with $k_1$ many $state_1$'s, $k_2$ many $state_2$'s, ..., and $k_T$ many $state_T$'s, privacy violation detector 212 may calculate the remaining entropy for user $u_i$, which is $-(\Sigma_{j=1}^T q_{ij} \log q_{ij})$, as explained previously. Note that the calculated remaining entropy for user $u_i$ is the left over entropy resulting from the release of database $\tau(M(D,P))$ that includes multiple bits for each user. Furthermore, note that the probabilities calculated to determine the left over entropy are for the public data, assuming that the new data in database $\tau(M(D,P))$ is released and made public.

Privacy violation detector 212 is further configured to use the calculated measure of entropy to determine whether the release of the anonymized and sanitized database $\tau(M(D,P))$ may result in a privacy violation. More specifically, privacy violation detector 212 may detect a potential privacy violation based on a comparison of the calculated measure of entropy and a privacy threshold. In any such cases, privacy violation detector 212 is able to detect a potential privacy violation as a result of a release of new data without actually releasing or having to release the new data.

Figure 3:
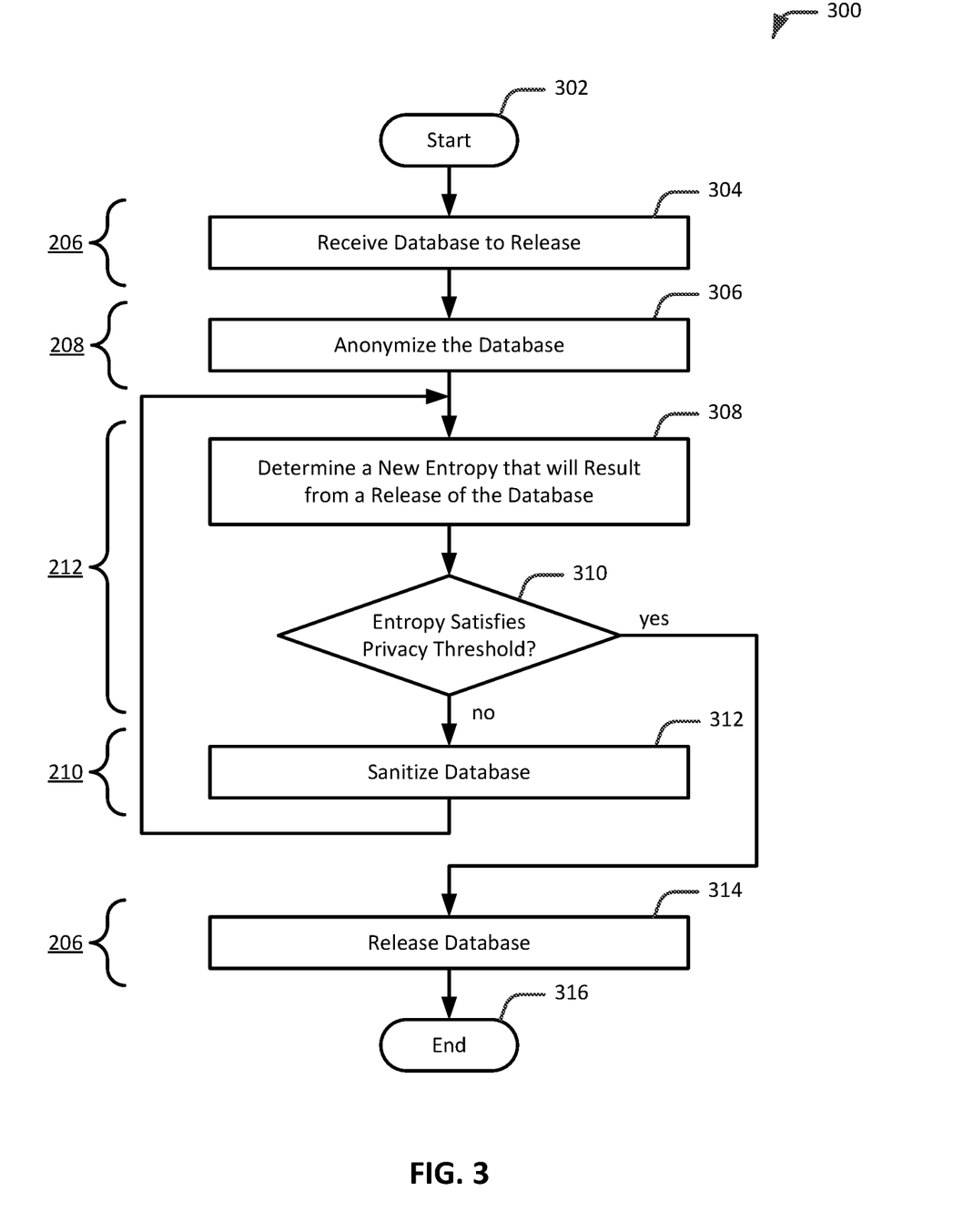
FIG. 3 is a flow diagram illustrating an example process for detecting and preventing a privacy violation.
Figure 4:
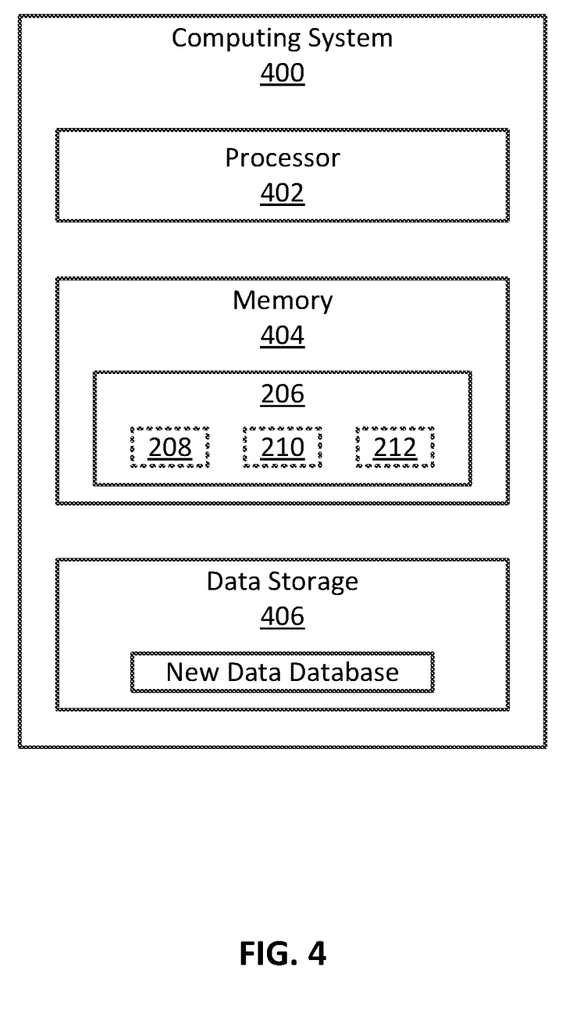
FIG. 4 is a block diagram illustrating selected components of an example computing system that may be used to perform any of the techniques as variously described in the present disclosure, all in accordance with at least some embodiments of the present disclosure.

FIG. 3 is a flow diagram illustrating an example process 300 for detecting and preventing a privacy violation, in accordance with at least some embodiments of the present disclosure. The operations, functions, or actions illustrated in example process 300 may in some embodiments be performed by data release system 200 and, more particularly, data releaser 206 of computing device 202 of FIG. 2. The operations, functions, or actions described in the respective blocks of example process 300 may also be stored as computer-executable instructions in a non-transitory computer-readable medium, such as memory 404 and/or data storage 406 of a computing system 400. In some instances, process 300 may be performed by components of computing device 202.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 3, process 300 is initiated at block 302. By way of an example use case, an advertisement exchange service may be interested in maintaining user privacy while providing user data to various advertisement networks. Prior to releasing new data regarding the users to the advertisement networks, the advertisement exchange service may utilize a data release system, such as data release system 200, to check for potential privacy violations that may result from releasing the new data.

At block 304, a new data database to release may be received by or otherwise made available to data releaser 206. Continuing the advertisement exchange service example above, the new data may be included in the new data database.

At block 306, anonymizer 208 anonymizes the new data database. For example, the new data database may be anonymized by replacing the identities of the users in the new data database with random tracking data. In some embodiments, anonymizer 208 may provide or otherwise make available the new data database to sanitizer 210. Sanitizer 210 may then sanitize the information in the new data database. For example, sanitizer 210 may perturb one or more values in the new data database.

At block 308, privacy violation detector 212 calculates a new entropy resulting from a release of the anonymized and, in some instances, sanitized new data database. According to an example implementation, privacy violation detector 212 may, for each user in the new data database, calculate a remaining entropy resulting from the release of the anonymized new data database. From the calculated respective remaining entropy for each user in the new data database, privacy violation detector 212 selects (e.g., uses) the smallest calculated remaining entropy (e.g., the calculated remaining entropy having the smallest measure or value) as the new entropy resulting from the release of the anonymized new data database. For example, suppose user A and user B are in the new data database, and the calculated remaining entropy for user A is less than the calculated remaining entropy for user B. In this case, the calculated remaining entropy for user A (e.g., the smaller measure of entropy representing less lack of order) is selected as the new entropy resulting from the release of the anonymized new data database. That is, the new measure of entropy (e.g., the lack of order) for the database is represented by the smallest or least measure of entropy for a user in the database.

At decision block 310, privacy violation detector 212 determines whether the new entropy resulting from the release of the anonymized new data database satisfies a privacy threshold. Continuing the advertisement exchange service example above, the privacy threshold, for instance, may be specified by the advertisement exchange service. As previously described, a higher privacy threshold provides a higher level of privacy. Thus, to detect a potential privacy violation, the smallest measure of entropy for a user in the anonymized new data database may be selected as the new entropy for the anonymized new data database, and be compared with the privacy threshold. If the new entropy resulting from the release of the anonymized new data database does not satisfy the privacy threshold, then privacy violation detector 212 determines that a privacy violation may occur by the release of the anonymized new data database, and does not allow the release of the new data database. In some implementations, privacy violation detector 212 may provide an indication, such as a warning message or other suitable visual indication, to alert a user of the detection of a privacy violation. In some embodiments, privacy violation detector 212 may provide or otherwise make available the anonymized new data database to sanitizer 210. At block 312, sanitizer 210 may further sanitize the anonymized new data database. In any case, the further sanitized new data database may again be processed to determine whether the further sanitized new data database may be released with a reduced risk of a privacy violation.

Otherwise, if, at decision block 310, a determination is made that the new entropy resulting from the release of the anonymized new data database satisfies the privacy threshold, privacy violation detector 212 determines that the anonymized new data database may be released with a reduced risk of a privacy violation. In this case, privacy violation detector 212 allows the release of the anonymized new data database. For instance, privacy violation detector 212 may then provide or otherwise make available the anonymized new data database to data releaser 206 for release.

At block 314, data releaser 206 releases the anonymized new data database. Process 300 then ends at block 314.

In some embodiments, additional or alternative operations may be performed. For example, in one embodiment, privacy violation detector 212 may not provide the anonymized new data database to sanitizer 210 for further processing upon determining that the new entropy resulting from the release of the anonymized new data database fails to satisfy the privacy threshold. For example, in this case, privacy violation detector 212 may further record the detection of the privacy violation in a log file, and process 300 may end without re-attempting to release the anonymized new data database.

FIG. 4 is a block diagram illustrating selected components of an example computing system 400 that may be used to perform any of the techniques as variously described in the present disclosure, in accordance with at least some embodiments of the present disclosure. In some embodiments, computing system 400 may be configured to implement or direct one or more operations associated with some or all of the engines, components and/or modules associated with data release system 200 of FIG. 2. For example, data releaser 206, including anonymizer 208, perturber 210, and privacy violation detector 212, or any combination of these may be implemented in and/or using computing system 400. In one example case, for instance, each of data releaser 206, anonymizer 208, perturber 210, and privacy violation detector 212 is loaded in memory 404 and executable by a processor 402, and new data database is included in data storage 406. Computing system 400 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 400 may include processor 402, memory 404, and data storage 406. Processor 402, memory 404, and data storage 406 may be communicatively coupled.

In general, processor 402 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, processor 402 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 402 may be configured to interpret and/or execute program instructions and/or process data stored in memory 404, data storage 406, or memory 404 and data storage 406. In some embodiments, processor 402 may fetch program instructions from data storage 406 and load the program instructions in memory 404. After the program instructions are loaded into memory 404, processor 402 may execute the program instructions.

For example, in some embodiments, any one or more of the engines, components and/or modules of data release system 200 may be included in data storage 406 as program instructions. Processor 402 may fetch some or all of the program instructions from data storage 406 and may load the fetched program instructions in memory 404. Subsequent to loading the program instructions into memory 404, processor 402 may execute the program instructions such that the computing system may implement the operations as directed by the instructions.

In some embodiments, virtualization may be employed in computing system 400 so that infrastructure and resources in computing system 400 may be shared dynamically. For example, a virtual machine may be provided to handle a process running on multiple processors so that the process appears to be using only one computing resource rather than multiple computing resources. Multiple virtual machines may also be used with one processor.

Memory 404 and data storage 406 may include computer-readable storage media for carrying or having computer-executable instructions or data structures stored thereon. Such computer-readable storage media may include any available media that may be accessed by a general-purpose or special-purpose computer, such as processor 402. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 402 to perform a certain operation or group of operations.

Modifications, additions, or omissions may be made to computing system 400 without departing from the scope of the present disclosure. For example, in some embodiments, computing system 400 may include any number of other components that may not be explicitly illustrated or described herein.

As indicated above, the embodiments described in the present disclosure may include the use of a special purpose or a general purpose computer (e.g., processor 402 of FIG. 4) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 404 of FIG. 4) for carrying or having computer-executable instructions or data structures stored thereon.

In one example use case and embodiment, the data release system disclosed herein may be used for the privacy preserving release of medical data for medical research. Medical research may, for instance, be dependent on extensive patient data for observing correlations between observable characteristics and diagnosis of a disease. Also, some of the data from particular patients may correlate with information that a medical research institution already possesses or has, and which is linked to the identification of such particular patients. Now, suppose a hospital desires to release anonymized data on patients to the medical research institution in order to obtain the research results on these patients. Much of the patent data may be mapped to small domains, such as the presence or absence of an indicator and histogram ranges of the quantity of a substance, to name two examples. In any case, the hospital has existing knowledge of what is publically known regarding a patient and what the medical research institution already knows regarding the patient. The hospital may then include the patent data that the hospital wants to release in a database, and apply a suitable anonymization mechanism to generate an anonymized database. For instance, the hospital may use the data release system to anonymize the patient identifiers (e.g., patient identities) in the database to generate the anonymized database. The hospital may also use the data release system to sanitize the database, and determine whether releasing the anonymized sanitized database of patient data may result in a privacy violation.

In another example use case and embodiment, the data release system may be used by a corporation to publish anonymized customer databases with a reduced risk of a privacy violation. For instance, a corporation may desire to publish an anonymized customer database so that the research community may analyze the data and create improved predictors for generating particular outcomes. As one example, an entertainment company, such as Netflix, may release or otherwise provide anonymized datasets for optimizing movie recommendations. As another example, an online service that provides crowd-sourced reviews and recommendations, such as Yelp, may release anonymized datasets for optimizing business recommendation. In any such cases, the released datasets may be subjected to de-anonymization attacks, which may lead to privacy loss for individuals and damage to the companies releasing such datasets. These companies may use the data release system disclosed herein to anonymize datasets and release the datasets if the release of the datasets may not likely cause a privacy violation.

Numerous example variations and configurations will be apparent in light of this disclosure. According to some examples, computer-implemented methods to detect a potential privacy violation as a result of a release of a database are described. An example computer-implemented method may include: anonymizing a database, wherein the database includes one or more users, and one or more columns for each user in the database; calculating a measure of entropy resulting from a release of the anonymized database without releasing the anonymized database; determining whether the calculated measure of entropy satisfies a privacy threshold; and responsive to a determination that the calculated measure of entropy satisfies the privacy threshold, releasing the anonymized database.

In some examples, calculating the measure of entropy as a result of the release of the anonymized database may include: calculating a remaining entropy for each user in the anonymized database as a result of the release of the anonymized database; and selecting a smallest calculated remaining entropy as the measure of entropy resulting from the release of the anonymized database. In other examples, the anonymized database includes one column for each user in the anonymized database, and calculating the remaining entropy for each user is according to the logarithmic term: $-(q_i \log q_i + (1-q_i) \log(1-q_i))$. In still other examples, the anonymized database includes multiple columns for each user in the anonymized database, and calculating the remaining entropy for each user is according to the logarithmic term: $-(\Sigma_{j=1}^{T} q_{ij} \log q_{ij})$. In yet other examples, anonymizing the database may include replacing a user identifier of each user in the database with at least one of: random tracking data, a random number, or a random identifier. In yet other examples, the method may also include, prior to calculating the measure of entropy resulting from the release of the anonymized database, sanitizing the anonymized database. In further examples, the method may also include, responsive to a determination that the calculated measure of entropy does not satisfy the privacy threshold, not allowing a release of the anonymized database. In still further examples, the calculated measure of entropy is a first measure of entropy, and the method may also include: sanitizing the anonymized database; calculating a second measure of entropy resulting from a release of the sanitized anonymized database without releasing the sanitized anonymized database; and determining whether the calculated second measure of entropy satisfies the privacy threshold.

According to some examples, computer program products including one or more non-transitory machine readable mediums encoded with instructions that when executed by one or more processors cause a process to be carried out to detect a potential privacy violation as a result of a release of a database are described. An example process may include: anonymizing, by an anonymizer, a database, wherein the database includes one or more users, and one or more columns for each user in the database; sanitizing, by a sanitizer, the anonymized database to generate a sanitized anonymized database; calculating, by a privacy violation detector, a measure of entropy resulting from a release of the sanitized anonymized database without releasing the sanitized anonymized database; determining, by the privacy violation detector, whether the calculated measure of entropy satisfies a privacy threshold; and responsive to a determination that the calculated measure of entropy satisfies the privacy threshold, allowing, by the privacy violation detector, a release of the sanitized anonymized database.

In some examples, calculating the measure of entropy as a result of the release of the sanitized anonymized database includes: calculating a remaining entropy for each user in the sanitized anonymized database as a result of the release of the sanitized anonymized database; and selecting a smallest calculated remaining entropy as the measure of entropy resulting from the release of the sanitized anonymized database. In other examples, the sanitized anonymized database includes one column for each user in the sanitized anonymized database, and calculating the remaining entropy for each user is according to the logarithmic term: $-(q_i \log q_i + (1-q_i) \log(1-q_i))$. In still other examples, the sanitized anonymized database includes multiple columns for each user in the sanitized anonymized database, and calculating the remaining entropy for each user is according to the logarithmic term: $-(\Sigma_{j=1}^T q_{ij} \log q_{ij})$. In yet other examples, anonymizing the database includes applying a mapping function $\tau$ to a domain users. In further examples, sanitizing the anonymized database includes perturbing values of the anonymized database. In still further examples, the calculated measure of entropy is a first measure of entropy, and the process further includes: responsive to a determination that the calculated measure of entropy does not satisfy the privacy threshold, further sanitizing the sanitized anonymized database; calculating a second measure of entropy resulting from a release of the further sanitized anonymized database without releasing the further sanitized anonymized database; and determining whether the calculated second measure of entropy satisfies the privacy threshold.

According to other examples, systems to detect a potential privacy violation as a result of a release of a database are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: anonymize a database, wherein the database includes one or more users, and one or more columns for each user in the database; sanitize the anonymized database to generate a sanitized anonymized database; calculate a measure of entropy resulting from a release of the sanitized anonymized database without releasing the sanitized anonymized database; determine whether the calculated measure of entropy satisfies a privacy threshold; and, responsive to a determination that the calculated measure of entropy satisfies the privacy threshold, release the sanitized anonymized database.

In some examples, to calculate the measure of entropy as a result of the release of the sanitized anonymized database includes: to calculate a remaining entropy for each user in the sanitized anonymized database as a result of the release of the sanitized anonymized database; and to select a smallest calculated remaining entropy as the measure of entropy resulting from the release of the sanitized anonymized database. In other examples, the sanitized anonymized database includes one column for each user in the sanitized anonymized database, and to calculate the remaining entropy for each user is according to the logarithmic term: $-(q_i \log q_i + (1-q_i) \log(1-q_i))$. In still other examples, the sanitized anonymized database includes multiple columns for each user in the sanitized anonymized database, and to calculate the remaining entropy for each user is according to the logarithmic term: $-(\Sigma_{j=1}^T q_{ij} \log q_{ij})$. In yet other examples, the calculated measure of entropy is a first measure of entropy, and further wherein execution of the instructions causes the one or more processors to: responsive to a determination that the calculated measure of entropy does not satisfy the privacy threshold, further sanitize the sanitized anonymized database; calculate a second measure of entropy resulting from a release of the further sanitized anonymized database without releasing the further sanitized anonymized database; and determine whether the calculated second measure of entropy satisfies the privacy threshold.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to detect a potential privacy violation as a result of a release of a database, the method comprising:
    anonymizing the database, wherein the database includes a plurality of users, and one or more columns with data regarding the users in the database, for each user each column provides a first state or a second state with respect to an item corresponding to the column and one of the columns includes n number of first states;
    calculating, subsequent to the anonymizing of the database, a measure of entropy resulting from a release of the anonymized database without releasing the anonymized database, the measure of entropy calculated based on a probability of the n number of first states occurring given a random assignment of states in the column with respect to a probability of n−1 number of first states occurring given a random assignment of states in the column;
    determining whether the calculated measure of entropy satisfies a privacy threshold; and
    responsive to a determination that the calculated measure of entropy satisfies the privacy threshold, releasing the anonymized database.

2. The method of claim 1, wherein calculating the measure of entropy as a result of the release of the anonymized database comprises:
    calculating a remaining entropy for each user in the anonymized database as a result of the release of the anonymized database; and
    selecting a smallest calculated remaining entropy as the measure of entropy resulting from the release of the anonymized database.

3. The method of claim 2, wherein the anonymized database includes one column and calculating the remaining entropy for each user is according to the logarithmic term: $-(q_i \log q_i + (1-q_i) \log(1-q_i))$.

4. The method of claim 2, wherein the anonymized database includes multiple columns and calculating the remaining entropy for each user is according to the logarithmic term:

$$-\left(\sum_{j=1}^{T} q_{ij} \log q_{ij}\right).$$

5. The method of claim 1, wherein anonymizing the database comprises replacing a user identifier of each user in the database with at least one of: random tracking data, a random number, or a random identifier.

6. The method of claim 1, further comprising, prior to calculating the measure of entropy resulting from the release of the anonymized database, sanitizing the anonymized database.

7. The method of claim 1, further comprising, responsive to a determination that the calculated measure of entropy does not satisfy the privacy threshold, not allowing a release of the anonymized database.

8. The method of claim 7, wherein the calculated measure of entropy is a first measure of entropy, the method further comprising:
    sanitizing the anonymized database;
    calculating a second measure of entropy resulting from a release of the sanitized anonymized database without releasing the sanitized anonymized database; and
    determining whether the calculated second measure of entropy satisfies the privacy threshold.

9. A computer program product including one or more non-transitory machine readable mediums encoded with instruction that when executed by one or more processors cause a process to be carried out to detect a potential privacy violation as a result of a release of a database, the process comprising:
    anonymizing the database, wherein the database includes a plurality of users, and one or more columns with data regarding the users in the database, for each user each column provides a first state or a second state with respect to an item corresponding to the column and one of the columns includes n number of first states;
    sanitizing the anonymized database to generate a sanitized anonymized database;
    calculating, subsequent to the anonymizing and the sanitizing of the database, a measure of entropy resulting from a release of the sanitized anonymized database without releasing the sanitized anonymized database, the measure of entropy calculated based on a probability of the n number of first states occurring given a random assignment of states in the column with respect to a probability of n–1 number of first states occurring given a random assignment of states in the column;

determining whether the calculated measure of entropy satisfies a privacy threshold; and responsive to a determination that the calculated measure of entropy satisfies the privacy threshold, allowing a release of the sanitized anonymized database.

10. The computer program product of claim 9, wherein calculating the measure of entropy as a result of the release of the sanitized anonymized database comprises:

calculating a remaining entropy for each user in the sanitized anonymized database as a result of the release of the sanitized anonymized database; and selecting a smallest calculated remaining entropy as the measure of entropy resulting from the release of the sanitized anonymized database.

11. The computer program product of claim 10, wherein the sanitized anonymized database includes one column, and calculating the remaining entropy for each user is according to the logarithmic term: $-(q_i \log q_i + (1-q_i) \log(1-q_i))$.

12. The computer program product of claim 10, wherein the sanitized anonymized database includes multiple columns, and calculating the remaining entropy for each user is according to the logarithmic term:

$$-\left(\sum_{j=1}^{T} q_{ij} \log q_{ij}\right).$$

13. The computer program product of claim 9, wherein anonymizing the database comprises applying a mapping function $\tau$ the users.

14. The computer program product of claim 9, wherein sanitizing the anonymized database comprises perturbing values of the anonymized database.

15. The computer program product of claim 9, wherein the calculated measure of entropy is a first measure of entropy, the process further comprising:

responsive to a determination that the calculated measure of entropy does not satisfy the privacy threshold, further sanitizing the sanitized anonymized database;

calculating a second measure of entropy resulting from a release of the further sanitized anonymized database without releasing the further sanitized anonymized database; and determining whether the calculated second measure of entropy satisfies the privacy threshold.

16. A system to detect a potential privacy violation as a result of a release of a database, the system comprising:

one or more non-transitory machine readable mediums configured to store instructions; and one or more processors configured to execute the instructions stored on the one or more non-transitory machine readable mediums, wherein execution of the instructions causes the one or more processors to:

anonymize the database, wherein the database includes a plurality of users, and one or more columns with data regarding the users in the database, for each user each column provides a first state or a second state with respect to an item corresponding to the column and one of the columns includes n number of first states, sanitize the anonymized database to generate a sanitized anonymized database, calculate, subsequent to the anonymizing and the sanitizing of the database, a measure of entropy resulting from a release of the sanitized anonymized database without releasing the sanitized anonymized database, the measure of entropy calculated based on a probability of the n number of first states occurring given a random assignment of states in the column with respect to a probability of n–1 number of first states occurring given a random assignment of states in the column, determine whether the calculated measure of entropy satisfies a privacy threshold, and responsive to a determination that the calculated measure of entropy satisfies the privacy threshold, release the sanitized anonymized database.

17. The system of claim 16, wherein to calculate the measure of entropy as a result of the release of the sanitized anonymized database comprises:

to calculate a remaining entropy for each user in the sanitized anonymized database as a result of the release of the sanitized anonymized database; and to select a smallest calculated remaining entropy as the measure of entropy resulting from the release of the sanitized anonymized database.

18. The system of claim 17, wherein the sanitized anonymized database includes one column, and to calculate the remaining entropy for each user is according to the logarithmic term: $-(q_1 \log q_1 + (1-q_1) \log(1-q_1))$.

19. The system of claim 17, wherein the sanitized anonymized database includes multiple columns, and to calculate the remaining entropy for each user is according to the logarithmic term:

$$-\left(\sum_{j=1}^{T} q_{ij} \log q_{ij}\right).$$

20. The system of claim 16, wherein the calculated measure of entropy is a first measure of entropy, and further wherein execution of the instructions causes the one or more processors to:

responsive to a determination that the calculated measure of entropy does not satisfy the privacy threshold, further sanitize the sanitized anonymized database;

calculate a second measure of entropy resulting from a release of the further sanitized anonymized database without releasing the further sanitized anonymized database; and determine whether the calculated second measure of entropy satisfies the privacy threshold.

* * * * *